(12) United States Patent
Dobbie et al.

(10) Patent No.: US 8,243,103 B2
(45) Date of Patent: Aug. 14, 2012

(54) LASER AIMING SPOT DISTINGUISHING METHODS AND APPARATUS

(75) Inventors: Blair Dobbie, Roanoke, VA (US); Tim Trudeau, Roanoke, VA (US)

(73) Assignee: Exelis, Inc., McLean, VA (US)

( * ) Notice: Subject to any disclaimer, the term of this patent is extended or adjusted under 35 U.S.C. 154(b) by 449 days.

(21) Appl. No.: 12/474,869

(22) Filed: May 29, 2009

(65) Prior Publication Data
US 2010/0302282 A1    Dec. 2, 2010

(51) Int. Cl.
*G09G 5/00* (2006.01)
*G01S 13/00* (2006.01)
*G02F 1/00* (2006.01)

(52) U.S. Cl. .......................... 345/666; 342/94; 359/237
(58) Field of Classification Search .................... 359/631
See application file for complete search history.

(56) References Cited

U.S. PATENT DOCUMENTS

| | | | | |
|---|---|---|---|---|
| 5,563,600 | A * | 10/1996 | Miyake | 341/173 |
| 5,584,137 | A * | 12/1996 | Teetzel | 42/117 |
| 5,701,202 | A |  12/1997 | Takahashi | |
| 6,560,029 | B1 | 5/2003 | Dobbie et al. | |
| 7,116,491 | B1 | 10/2006 | Willey et al. | |
| 2005/0268521 | A1 | 12/2005 | Cox et al. | |
| 2005/0269481 | A1* | 12/2005 | David et al. | 250/208.1 |
| 2006/0232761 | A1 | 10/2006 | McConville et al. | |
| 2006/0265147 | A1* | 11/2006 | Yamaguchi et al. | 702/40 |
| 2007/0222665 | A1* | 9/2007 | Koeneman | 342/29 |

OTHER PUBLICATIONS

Ambrosch, Jeannette, Authorized Officer of European Patent Office, "International Search Report and Written Opinion of PCT/US2010/033966", Feb. 25, 2011.

* cited by examiner

*Primary Examiner* — Kee M Tung
*Assistant Examiner* — Sing-Wai Wu
(74) *Attorney, Agent, or Firm* — RatnerPrestia

(57) ABSTRACT

System and methods for distinguishing a laser aiming spot associated with a particular firearm from other laser aiming spots are disclosed. The laser aiming spot may be distinguished by imaging a field of view, the field of view including the laser aiming spot and the other laser aiming spots, identifying the laser aiming spot associated with the particular firearm within the imaged field of view, modifying the imaged field of view to distinguish the identified laser aiming spot from the other laser aiming spots, and displaying the modified imaged field of view.

15 Claims, 16 Drawing Sheets

LASER AIMING SPOT DISTINGUISHING METHODS AND APPARATUS

FIELD OF THE INVENTION

The present invention is directed to night vision methods and apparatus and, more specifically, to night vision methods and apparatus for distinguishing laser aiming spots.

BACKGROUND OF THE INVENTION

Night vision systems are used in a wide variety of applications to enable sight in dark environments. For example, night vision systems are utilized by military soldiers patrolling the ground at night. A conventional night vision system utilizes an image intensifier ($I^2$) to amplify light from an image within a field of view of the night vision system. The image intensifier collects tiny amounts of light in a dark environment, including the lower portion of the infrared light spectrum, that are present in the environment within the field of view but may be imperceptible to the human eye. The image intensifier amplifies the collected light from the image so that the human eye can perceive the image. Such image intensifiers are commonly employed in night vision goggles, i.e., monoculars or binoculars, that are worn on a user's head.

Modern military firearms are often configured with laser aiming devices for use in aiming at targets. Emissions from the laser aiming devices are detectable by image intensifier devices. When a laser of a laser aiming device is pointed at a target by a user, the laser produces a spot of light (laser aiming spot) on the target. A night vision system such as discussed above intensifies the light in the environment using an image intensifier device, including light from the laser aiming spot, and presents it to the user.

SUMMARY OF THE INVENTION

The present invention is embodied in systems and methods for distinguishing a laser aiming spot associated with a particular firearm from other laser aiming spots. The laser aiming spot may be distinguished by imaging a field of view, the field of view including the laser aiming spot and the other laser aiming spots, identifying the laser aiming spot associated with the particular firearm within the imaged field of view, modifying the imaged field of view to distinguish the identified laser aiming spot from the other laser aiming spots, and displaying the modified imaged field of view.

DETAILED DESCRIPTION OF THE INVENTION

Figure 1:
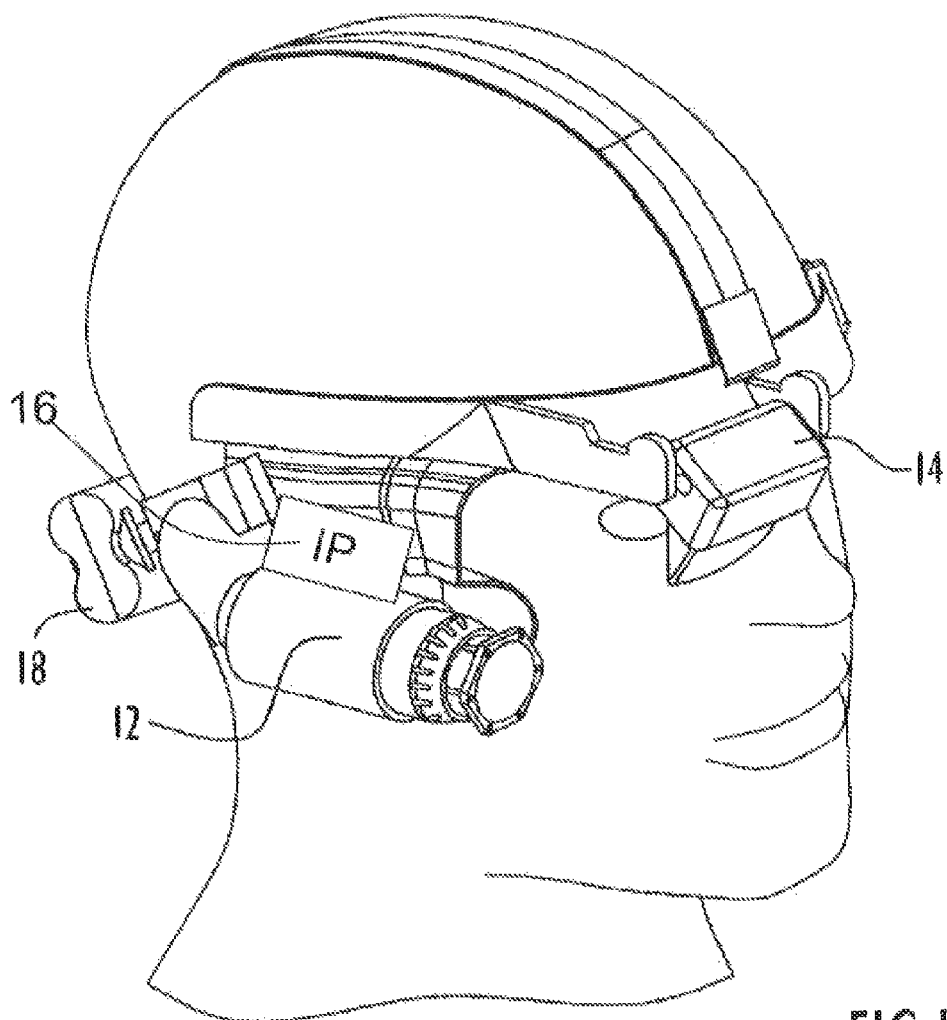
FIG. 1 is a perspective view of an exemplary night vision system in accordance with aspects of the present invention.

FIG. 1 depicts an embodiment of the present invention as worn by a user. The present invention uses an image intensified video camera 12 to collect light within the field of view (FOV) of video camera 12 and a video display 14 in front of the eye of the user to display an image of the field of view. Image processing electronics 16 in accordance with the present invention are coupled between video camera 12 and video display 14 to, as will be described in further detail below, process an output signal from video camera 12 to produce an input signal for video display 14. A power supply module 18, for example, a battery pack, provides power to video camera 12, video display 14, and image processor 16.

Figure 2A:
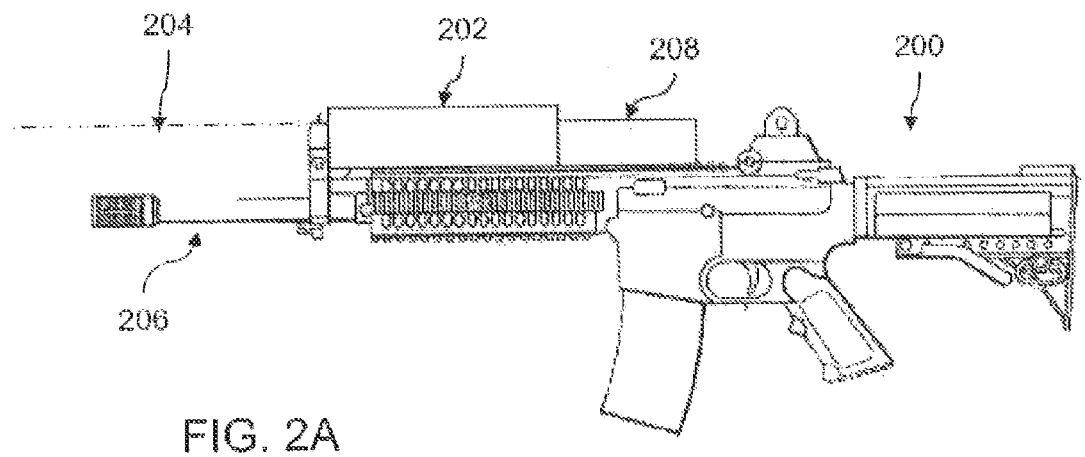
FIG. 2A is an illustration of a firearm in accordance with aspects of the present invention.

FIG. 2A depicts a firearm 200 including a laser aiming device 202. Laser aiming device 202 is typically attached to a sight rail (not shown) on the firearm 200 and is boresighted to the bullet trajectory of firearm 200 to produce a laser aiming light 204 that extends in the direction that barrel 206 of firearm 200 is pointing. When laser aiming light 204 impinges on a surface of a target, a laser aiming spot (discussed below) is formed on the target. In an exemplary embodiment, laser aiming light 204 produced by laser aiming device 202 is a pulsed/modulated laser beam. The pulsed laser beam may be periodic or non-periodic. In an alternative embodiment, laser aiming light 204 may be a continuous wave laser beam.

A control 208, controls laser aiming device 202. In embodiments where laser aiming light 204 is pulsed, control 208 controls the pulse sequence (i.e., identification signature) and, optionally, the period of the pulse. The period of the pulse may be set according to a master clock (not shown) associated with control 208. Control 208 may be configured in a know manner from the description herein to transmit a digital signature associated with laser aiming device 202 and, optionally, the period of the signature. Control 208 may be a separate component or partially and/or fully incorporated into laser aiming device 202.

Figure 2B:
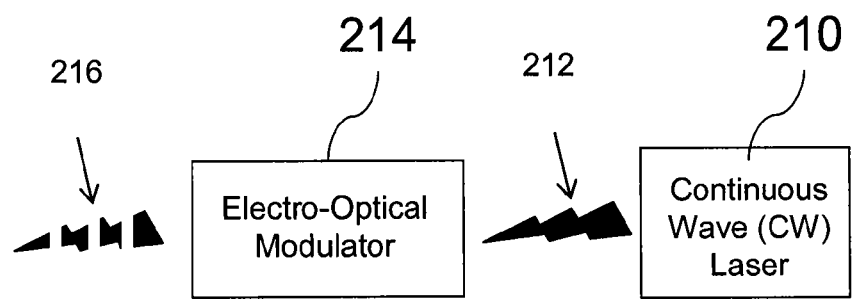
FIG. 2B is a conceptual illustration of one embodiment for generating modulated laser light for use with the firearm of FIG. 2A.
Figure 2C:
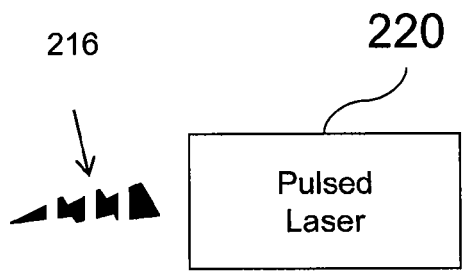
FIG. 2C is a conceptual illustration of another embodiment for generating modulated laser light for use with the firearm of FIG. 2A.

FIG. 2B depicts an exemplary embodiment for generating modulated laser light 216 with laser aiming device 202 (FIG. 2A) for use as pulsed/modulated laser aiming light 204. In FIG. 2B, a continuous wave (CW) laser 210 generates CW laser light 212. An electro-optical modulator 214 then modulates CW laser light 212 to generate modulated laser light 216. FIG. 2C depicts another exemplary embodiment for generating modulated laser light 216 with laser aiming device 202 (FIG. 2A). In accordance with this embodiment, a pulsed laser 220 generates modulated laser light 216. In accordance with this embodiment, a separate modulator may be omitted.

When multiple firearms with laser aiming devices are present in an environment and produce laser aiming spots within the field of view of a user's night vision system, the user's night vision system will present multiple laser aiming spots to the user. This may lead to confusion as to which laser aiming spot is associated with the user's firearm—leading to undesirable targeting delays. Thus, it is advantageous to be able to distinguish a laser aiming spot associated with a particular firearm from other laser aiming spots in the vicinity of the laser aiming spot.

Figure 3A:
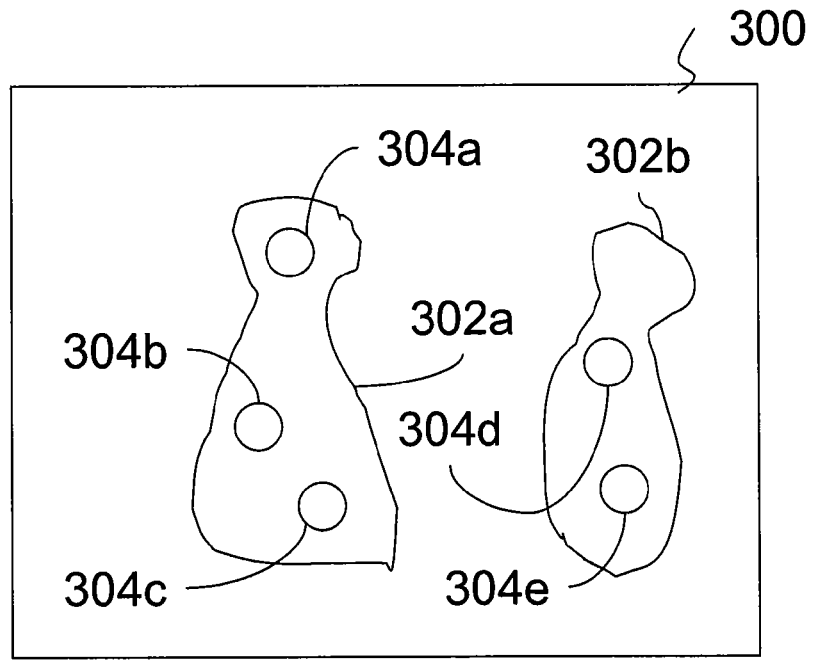
FIG. 3A is an illustrative image display of a prior art system.

FIG. 3A depicts a prior art image 300 of a field of view displayed by a video display such as video display 14. The image includes two identifiable objects 302a, b and five laser aiming spots 304a-e. It will be understood by one of skill in the art from the description herein that the five laser aiming spots are produced by the laser aiming lights of five associated laser aiming devices 202. Three laser aiming spots 304a-c are positioned on a first object 302a and two laser spots 304d, e are positioned on a second object. As illustrated, the five laser aiming spots 304a-e appear identical. Thus, a user of a firearm with an aiming device would be unable to readily distinguish the laser aiming spot produced by an aiming device on the user's firearm from the other aiming spots products by aiming devices of other firearms.

Figure 3B:
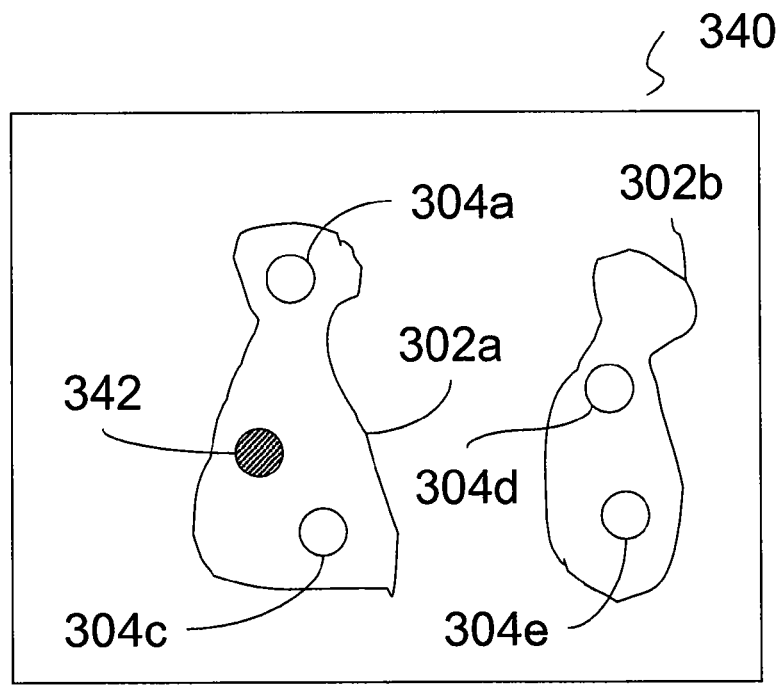
FIG. 3B is an illustrative image display of a system in accordance with aspects of the present invention.

FIG. 3B depicts an image 340 of a field of view displayed by a video display such as video display 14 in accordance with an aspect of the present invention. The image 340 is similar to the prior art image 300 depicted in FIG. 3A with the exception that laser aiming spot 304b in FIG. 3A is now an identifiable laser aiming spot 342 in FIG. 3B that is distinguishable from the other laser aiming spots 304a, c, d, e. In accordance with this aspect of the present invention, the user of firearm 200 associated with laser aiming device 202 that produces laser aiming spot 342 can quickly and easily identify laser aiming spot 342 produced by the user's firearm from laser aiming spots 304a, c, d, e produced by laser aiming devices associated with other firearms.

In the illustrated embodiment, identifiable laser aiming spot 342 has a different pattern than non-identifiable laser aiming spots 304a, c, d, e. In an alternative embodiment, spot 342 may have a different color or additional indicia, such as "cross hairs." In yet other embodiments, spot 342 may be distinguished in another matter such as by flashing when the other laser aiming spots are constantly illuminated, or vice versa, or by increasing the relative luminance of spot 342 to spots 304a, c, d, e. In still other embodiments, non-identifiable laser aiming spots 304a, c, d, e may be removed from the display by image processor 16, leaving only identifiable laser aiming spot 304b/342.

In an alternative exemplary embodiment, with the appropriate information available to image processor 16, any of the laser aiming spots in the field of view could be identified and uniquely labeled. With this method, the laser aiming spot in the video image could have a unique identifier (e.g., name, number, icon, etc.) placed next to the spot. This would allow others, e.g., a squad leader, to point at places within the FOV of video camera 12 (FIG. 1) to provide an additional tactical advantage.

Figure 4:
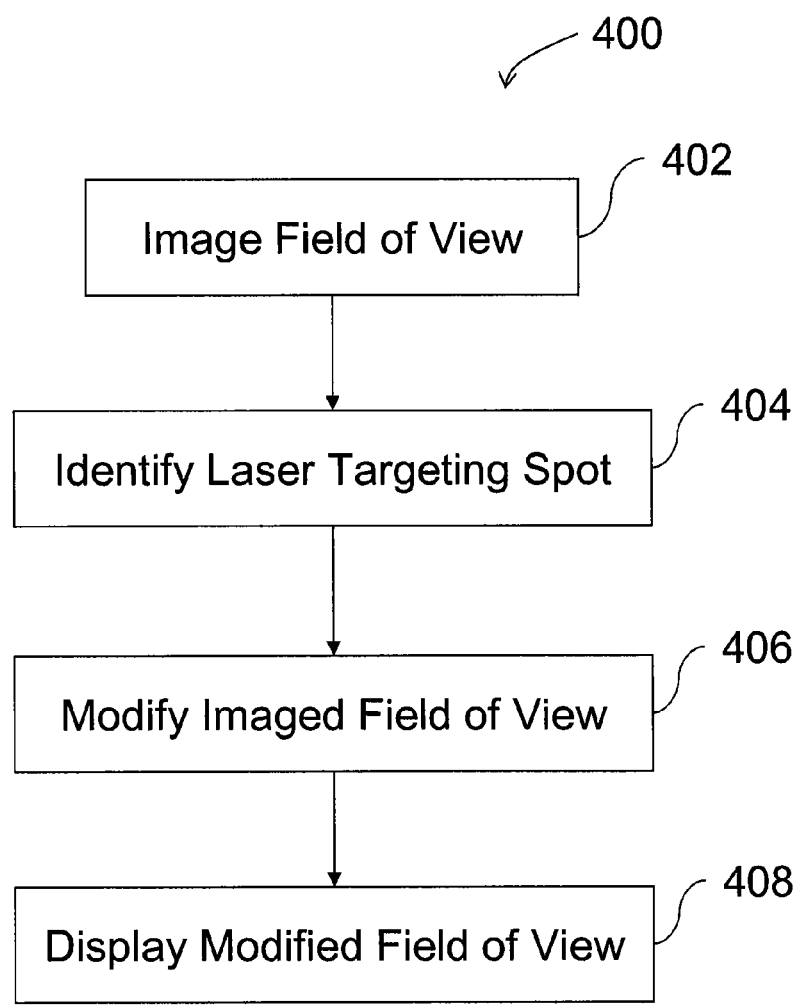
FIG. 4 is a flow chart depicting exemplary steps for distinguishing a laser aiming spot in accordance with one aspect of the present invention.

FIG. 4 depicts a flow chart 400 of exemplary steps for distinguishing a laser aiming spot associated with a particular firearm from other laser aiming spots. The steps of flow chart 400 are described with reference to the night vision system (camera 12, display 14, and image processing electronics 16), firearm 200, and image 340 of FIGS. 1, 2, and 3B, respectively, to facilitate description. One of skill in the art will recognize from the description herein that the steps of the present invention may be implemented using other night vision systems, firearms, and images without departing from the scope of the present invention.

At step 402, a field of view is imaged. In an exemplary embodiment, video camera 12 images the field of view.

At step 404, a laser aiming spot associated with a particular firearm is identified. In an exemplary embodiment, image processor 16 identifies the laser aiming spot in a field of view captured by video camera 12. Image processor 16 may identify the laser aiming spot produced by laser beam 204 associated with firearm 200 from the identification signature of the laser beam 204 provided by control 208 of firearm 200.

In one embodiment, the identification signature is a periodic pulse and identification of the laser aiming spot produced by laser beam 204 is performed by synchronizing a video camera gating (described below) within video camera 12 to the periodic pulse based on a master clock to increase the apparent luminance of the appropriately encoded laser aiming spot to distinguish this spot from other laser spots that may be in the field of view. Image processor 16 may then identify the laser aiming spot from the increased luminance and further process the laser aiming spot such that identifiable laser aiming spot 342 may be presented by video display 14. In an alternative embodiment, the identification signature is a non-periodic pulse and identification of the laser aiming spot produced by laser beam 204 is performed by synchronizing a gating within the video camera 12 to the non-periodic pulse to increase the apparent luminance of the laser aiming spot to identify laser aiming spot for processing and presentation by video display 14. In accordance with this embodiment, the gating is enabled on for sufficient duration to image the scene.

At step 406, the imaged field of view is modified to distinguish the identified laser aiming spot from other laser aiming spots. In an exemplary embodiment, image processor 16 modifies the imaged field of view.

At step 408, the modified field of view is displayed. In an exemplary embodiment, the modified field of view is displayed on video display 14.

Figure 5:
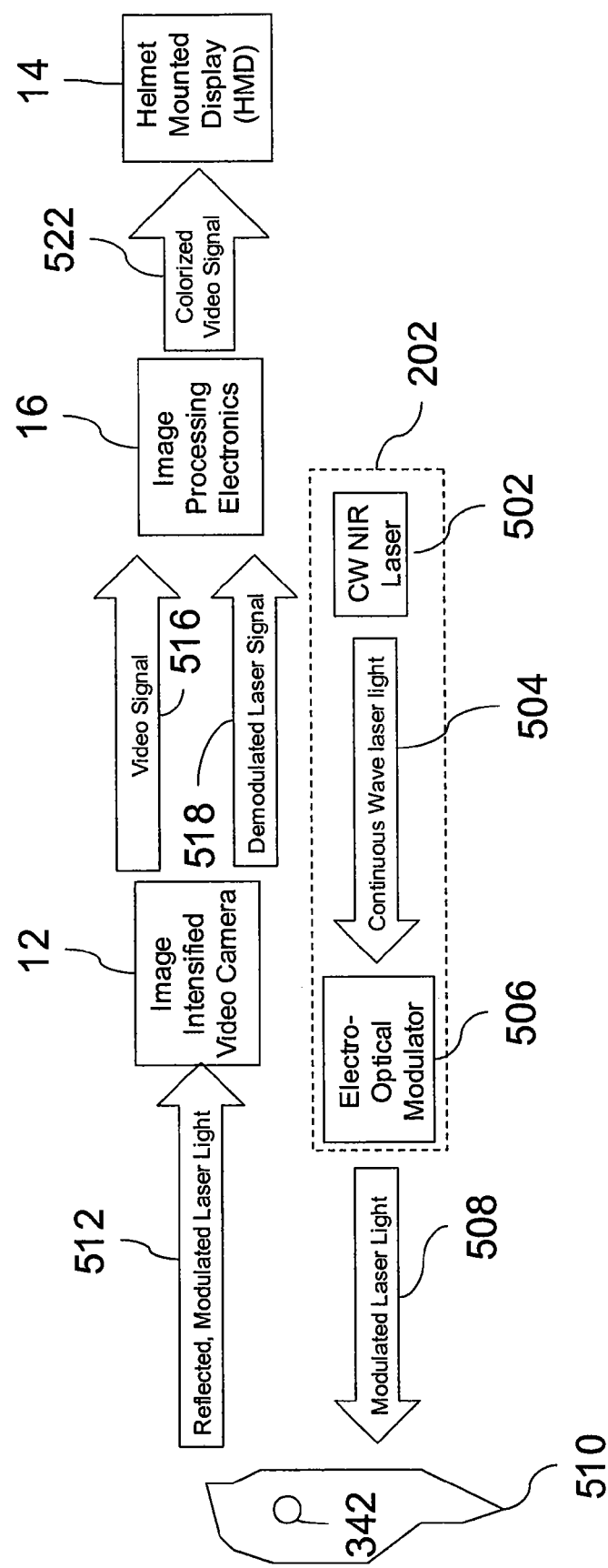
FIG. 5 is a block diagram depicting exemplary components and steps for distinguishing a laser aiming spot in accordance with one aspect of the present invention.

FIG. 5 depicts an overview of exemplary components and steps for distinguishing a laser aiming spot in accordance with an aspect of the present invention. In this example, the laser aiming spot is distinguished through the use of color.

A CW near infra red (NIR) laser 502 generates a light emission in the NIR band pass to produce a CW laser light 504 and an electro-optical modulator 506 modulates CW laser light 504 to produce a modulated laser light 508. Electro-optical modulator 506 effectively provides a rapid shuttering function, allowing the CW emissions 504 to pass through modulator 506 only when commanded by electronic logic (not shown). Suitable electronic logic will be understood by one of skill in the art from the description herein. CW NIR laser 502 and electro-optical modulator 506 may be combined in a single hardware component, e.g., within laser aiming device 202.

Modulated laser light 508 passes along a transmission path into object space within the field of view (FOV) of an image intensified video camera 12. The modulated laser light 508, emitted into object space, is contained within a narrow beam so as to form a laser aiming spot 342 when it impinges upon an object 510.

A portion of laser aiming spot 342 is diffusely reflected by object 510 back along the transmission path, and this reflected, modulated laser light 512 enters image intensified video camera 12 through its objective lens (described below). An image intensifier portion (described below) of camera 12 senses reflected light 512 and converts the radiant energy of reflected light 512 into electrons via the photoelectric effect. As described below, within camera 12, the small flux of photo electrons from an intensifier photo cathode reach an intensifier micro channel plate (MCP), are amplified, and the amplified electron flux travels to an intensifier anode. In an exemplary embodiment, this architecture and its electron flux is capable of responding to time variations in the laser light input on the order of micro seconds, which allows the image intensifier portion to act as a demodulator of the reflected, modulated laser light 512. The laser signal demodulation may be performed by an amplifier stage that is integral to a high voltage power supply (HVPS) powering the image intensifier portion.

Image intensified video camera 12 produces two data streams. One stream is a video signal 516 containing successive image frames. The other stream is a demodulated laser signal 518 which reproduces the data used by electro-optical modulator 506 to produce modulated laser light 508.

Image processing electronics 16 process video signal 516 and demodulated laser signal 518. Demodulated laser signal 518 is made up of packets that include an identification (ID) code that is unique to the modulated laser light 508 originating from the laser aiming device 202 and a timing signal/code that may be implemented by a recursive digital counter. Image processing electronics 16 use the ID code to identify the reflected, modulated laser light 512 associated with modulated laser light 508 from laser aiming device 202.

After identifying the reflected, modulated laser light 512, the image processing electronics 16 use the timing signal within the packets to synchronize an image processor, described below, to the periodic laser bursts. In an exemplary embodiment, image processing electronics 16 use this synchronized timing information to "gate on" an image intensifier for one video frame selected from a group of continuously flowing video frames. The occurrence and duration of the "gate on" is synchronized to the unique laser burst such that camera 12 is only sensitive to light during the time in which the reflected laser light 512 is arriving at the objective lens of camera 12. The video signal from this one frame contains a video image of the unique, selected laser burst. The image processing electronics 16 perform a digital analysis routine that identifies the two dimensional location of the laser spot 342 within the FOV of this frame. This laser spot location data is then stored in a memory (not shown) accessible by image processing electronics 16.

Succeeding video frames are gated for optimum exposure and contain laser returns from all laser spots within the FOV. Image processing electronics 16 use the laser spot location stored in memory to identify which of the laser spots is the unique spot that is to be colorized. As part of its video processing function, the image processing electronics 16 build a video frame in which the unique spot is colorized such that it clearly contrasts with any other laser spots in the FOV. This processed video is sent to a display 14, for example, to produce an image with laser aiming spot 342 distinguishable from other laser aiming spots (see FIG. 3B).

Image intensified video camera 12, image processing electronics 16 and display 14 may all be subsystems within a single hardware entity called a night vision goggle device (NVG). This device may be worn on the head of an individual, e.g., a war fighter, seeking enhanced visual data of an object space scene.

In accordance with this colorized aiming spot implementation, it is assumed that a unique modulation code of electro-optical modulator 506 within a laser aiming device 202 is "known" by image processing electronics 16 prior to operation. This code may be input to a memory associated with image processing electronics 16 in order for the NVG to identify and colorize the laser spot from a laser modulated with the unique modulation code.

Figure 6:
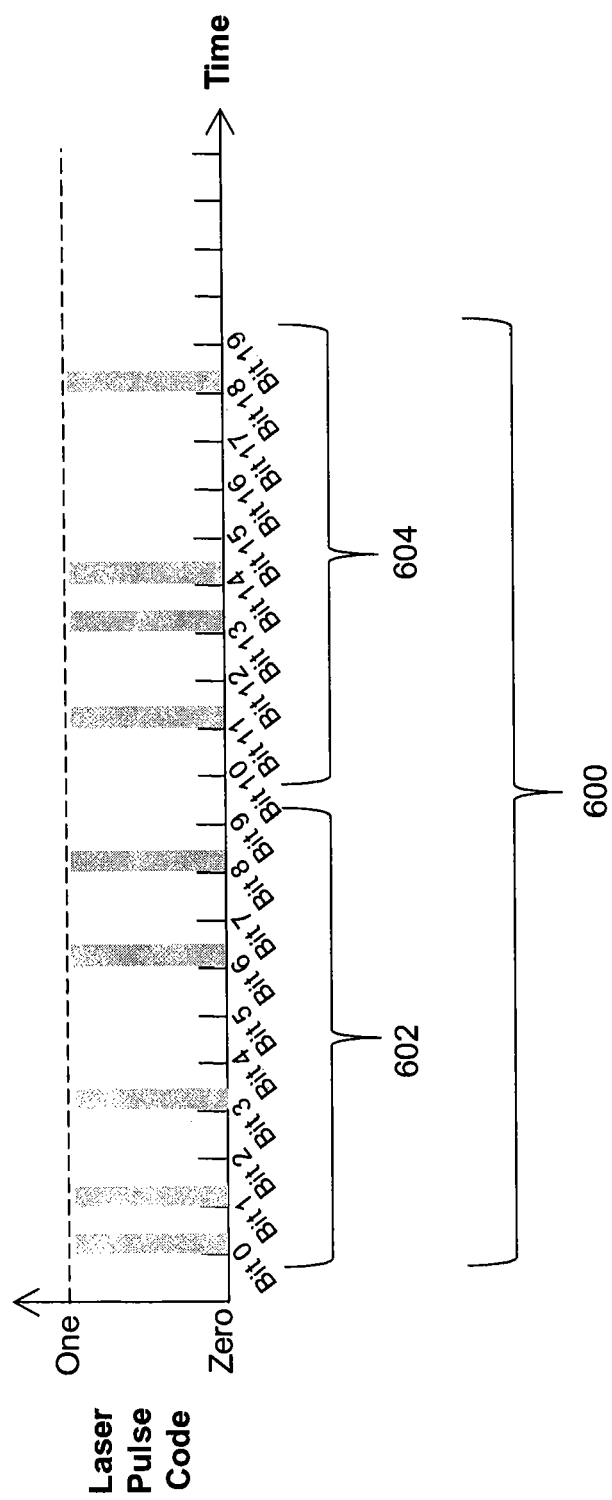
FIG. 6 is a graph of a pulse code packet in accordance with an aspect of the present invention.

FIG. 6 depicts a graph of an exemplary laser pulse code packet 600 for implementation by electro-optical modulator 506 (FIG. 5). The illustrated laser pulse code packet 600 includes twenty bits representing an ID number 602 (which is unique to the particular system) and a time code 604. It will be understood by one of skill in the art from the description herein that other packet bit counts are feasible and within the scope of the present invention. The packets may be transmitted continuously with ID number 602 repeated in each newly transmitted laser packet. The laser packet 600 may also include a cyclical redundancy check (CRC) set of bits to detect and discard corrupted data packets and improve the overall robustness of the system.

The grey vertical bars in the graph represent short bursts of laser emission from the electro-optical modulator 506 (FIG. 5). The spaces between the vertical bars represent time periods of no laser emission (e.g., emissions blocked by modulator 506). The laser emissions may also be formed as the "negative" of the waveform illustrated in FIG. 6 wherein the CW laser light 504 would be briefly interrupted to indicate an ON bit. This approach would transmit significantly more laser energy and could be used for long range targets or to improve the signal-to-noise ratio (SNR) of a demodulator subsystem.

In the depicted graph, using pure binary encoding, 10 bits deep, there are 1024 possible unique ID's. In this example, the unique ID number is decimal 331. Encoding can be pure binary, hexadecimal, or any comparable digital encoding scheme In an exemplary embodiment, time code 604 increments one least significant bit (LSB) in each successive packet. After reaching the maximum value allowed by the time code length (10 bits in this example), the value "wraps around" and starts again from zero.

Figure 7:
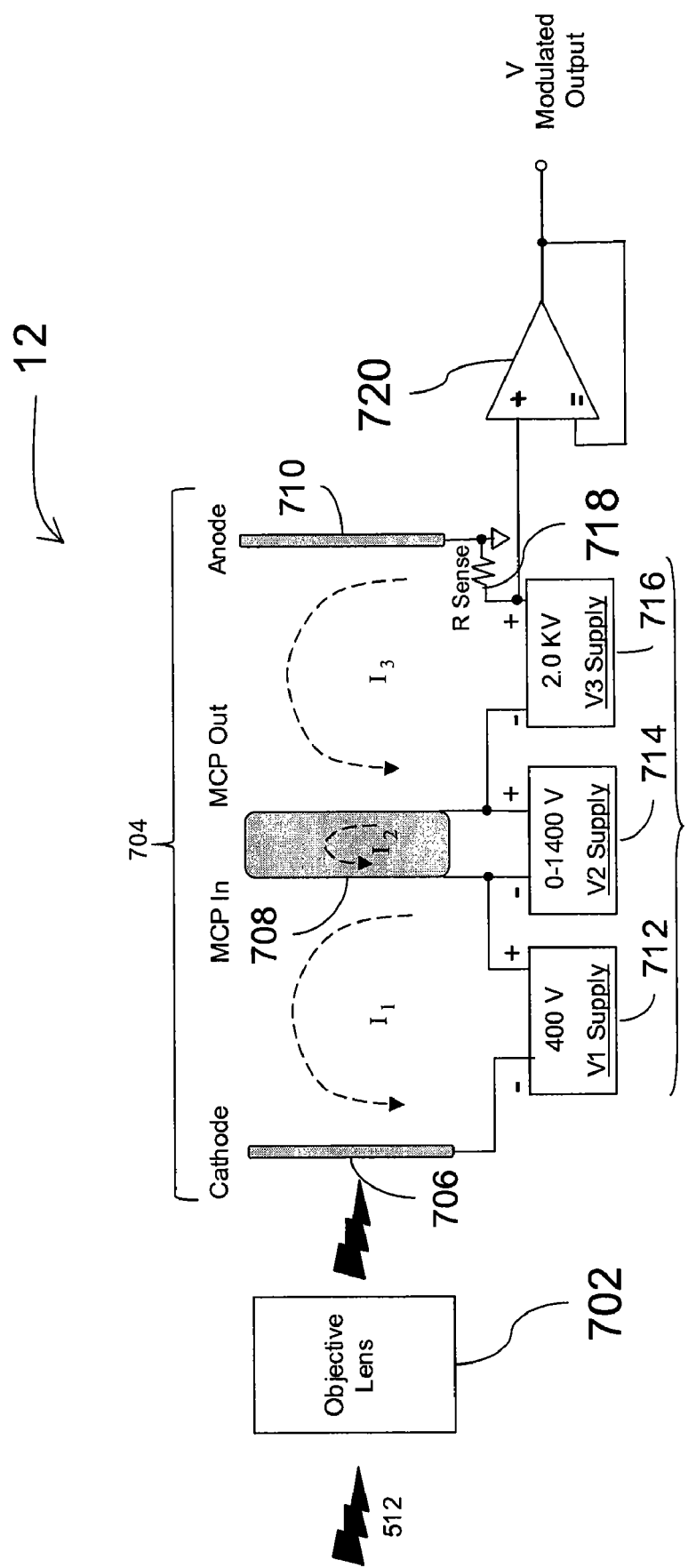
FIG. 7 is a block diagram of an exemplary image intensified video camera for use in the system depicted in FIG. 5 in accordance with an aspect of the present invention.

FIG. 7 depicts an exemplary image intensifier portion of an image intensified video camera 12. Camera 12 includes an image intensifier transducer having an intensifier tube 704 containing a cathode 706, a micro-channel plate (MCP) 708, an anode 710, and a high voltage power supply (HVPS) 711 that generates a first voltage potential (V1) 712, a second voltage potential (V2) 714, and a third voltage potential (V3) 716 to apply voltages and currents to the components of the intensifier tube 704.

Reflected laser light 512 enters camera 12 through an objective lens 702. When the incoming light 512 impinges on cathode 706, the photo electric effect generates photo electrons that are emitted by cathode 706 and accelerated across a vacuum gap between cathode 706 and MCP 708. These electrons are collected by the "MCP In" surface of MCP 708. The acceleration of the electrons is provided by V1 712. The current flow is represented, using conventional current representation, by the $I_1$ current loop in FIG. 7.

MCP 708 acts as a gain stage that amplifies the flux of electrons that arrive at the "MCP In" node. The gain function is provided by a plurality of photomultiplier channels in MCP 708. The power for this function is provided by V2 714. The current flow is represented, using conventional current representation, by the $I_2$ current loop in FIG. 7.

The electron flow from the "MCP Out" surface of MCP 708 is accelerated toward anode 710 by V3 716. The current flow is represented, by conventional current representation, by the $I_3$ current loop in FIG. 7.

The $I_3$ current flows through a resistor "R sense" 718, causing a voltage drop across resistor 718. This voltage drop is sensed and buffered by an operational amplifier (OpAmp) 720 that is set up as a voltage follower. The modulated laser light causes modulation of the image intensifier tube currents $I_1$, $I_2$, and $I_3$. This modulation is detected by the voltage follower, which reproduces the modulated voltage signal at the output of OpAmp 720. This modulated voltage signal carries the demodulated laser code and is sent to image processing electronics 16 (FIG. 5) for use in identifying the source of the reflected, modulated laser light 512.

The SNR of the demodulator may be improved with the addition of a high pass filter. This filter may be placed at the input to OpAmp 720, at the output of the OpAmp 720, or integrated into a feedback path of OpAmp 720.

In an exemplary embodiment, video data generated by the image intensified video camera 12 (FIG. 5) is produced by a CMOS imaging die having a conventional electronic readout architecture. The die receives the image from the intensifier tube 704 which effectively acts as preamplifier of the photoelectron image. This transfer of real time imagery from intensifier tube 704 to the CMOS die can be effected by different methods. One method entails the use of fused fiber optic bundle bonding utilized in conventional image intensified cameras wherein the photonic image is transferred, by the bundles, to the photon detecting surface of the die. The die resides outside of the physical envelope of the intensifier tube in this method. Another method entails integrating the die within the image intensifier envelope, wherein the die acts as the anode of the tube and receives the photoelectrons rather than photons.

Figure 8:
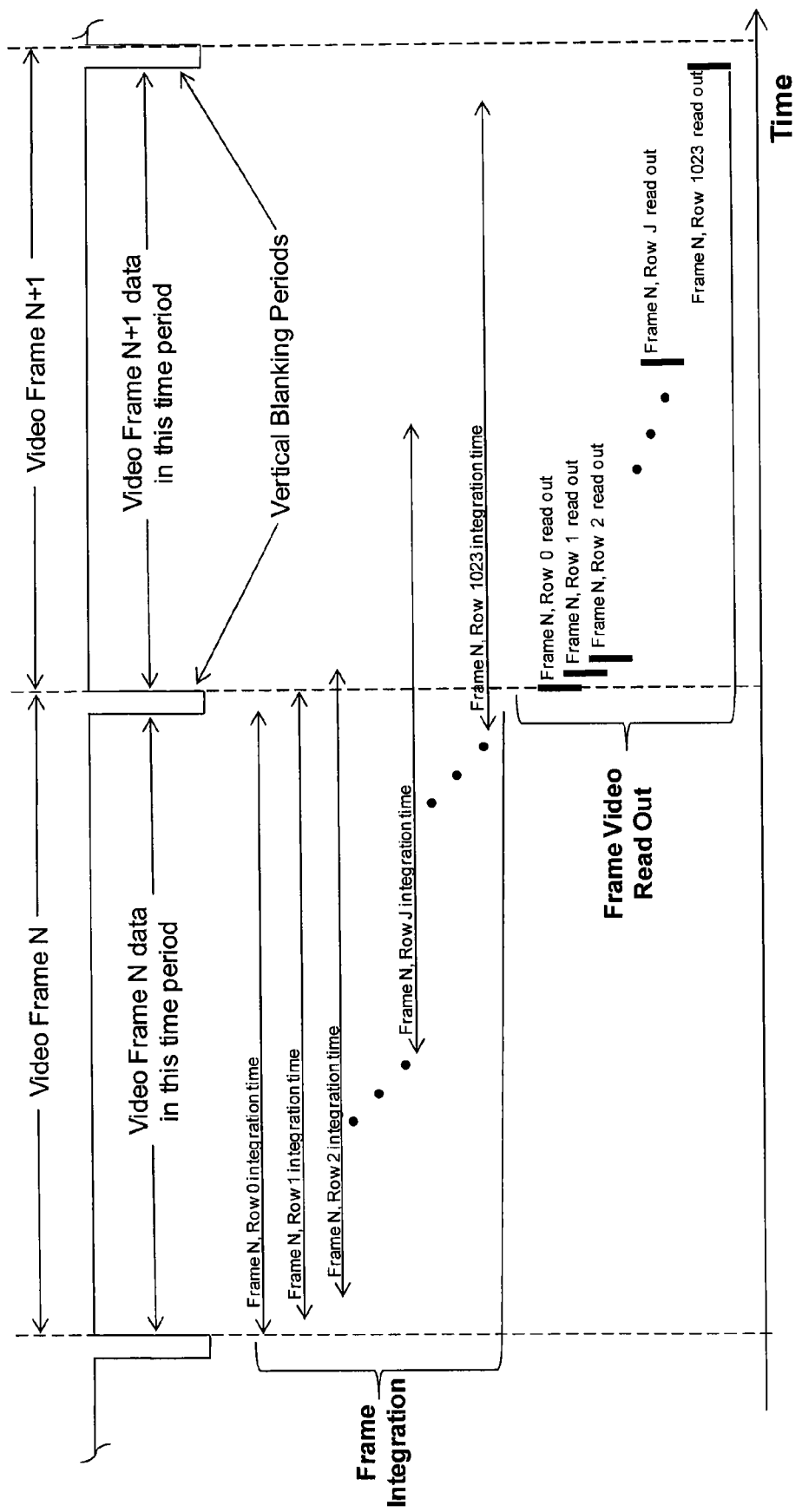
FIG. 8 is a graph depicting general timing constraints of the image processing electronics of FIG. 5.

FIG. 8 is a graph illustrating general timing constraints of a CMOS imaging die. The topmost portion of this graph shows the time-wise operation of the CMOS imaging die. The vertical dashed lines delineate the video frame time, or period. At the end of each video frame is a short period called the vertical blanking period, which may be used to reset periodic logic and act as a primary timing pulse to which subordinate timing waveforms are synchronized. The rising edge of each successive vertical blanking period may be defined to be the start of the next frame in image processing electronics 16. The areas of the graph between vertical blanking periods represent portions of the frame time within which video imagery is integrated and is read out as a video stream, which is explained in more detail below. The frame timing is a fixed periodic frequency that defines the timing framework to which the digital video processing is synchronized.

The timing diagram illustrated in the graph of FIG. 8 may be used with a CMOS imager process commonly called "rolling shutter." The lower portion of FIG. 8 illustrates the fundamental timed operations inherent to rolling shutter operation. This process can be divided into two functional steps that occur recursively to generate a real time video data stream. These two steps are frame integration and frame readout. Generally, a frame integration period, which is typically the full frame period minus the vertical blanking period, is used to generate a usable image. Additionally, two frame periods are generally used to generate a video frame; one for integration and one for read out of the video data stream.

CMOS imaging dies utilize an integration period within which the photons or photoelectrons impinging upon a pixel are allowed to accumulate within the pixel. The typical integration period equals the video frame time minus the vertical blanking period. Shorter integration periods are feasible and are sometimes used as a means of controlling camera gain. The rolling shutter process entails staggered, sequential integration periods for successive rows on the imaging chip. This is illustrated by the portion of FIG. 8 labeled "frame integration." Each row in the CMOS imaging die is allowed the same integration period.

The staggered time relationship of the successive rows observed in the frame integration portion of FIG. 8 are due to the readout timing illustrated by the lowest portion of FIG. 8, labeled "Frame Video Read Out." Each of the small vertical bars within this part of FIG. 8 represent the time required to read the pixels values from a given row of the CMOS imager and send this data to the "down-stream" electronics. Note that the row 0 readout occurs immediately after the rising edge of the frame period that immediately succeeds its integration frame period. Row 1 is read out next, etcetera, until all of the rows within the CMOS imaging die have been transmitted, in what was effectively a video data steam that comprised a single video image frame. This example shows the operation of a CMOS die with 1024 rows. Other row counts are feasible.

Figure 9:
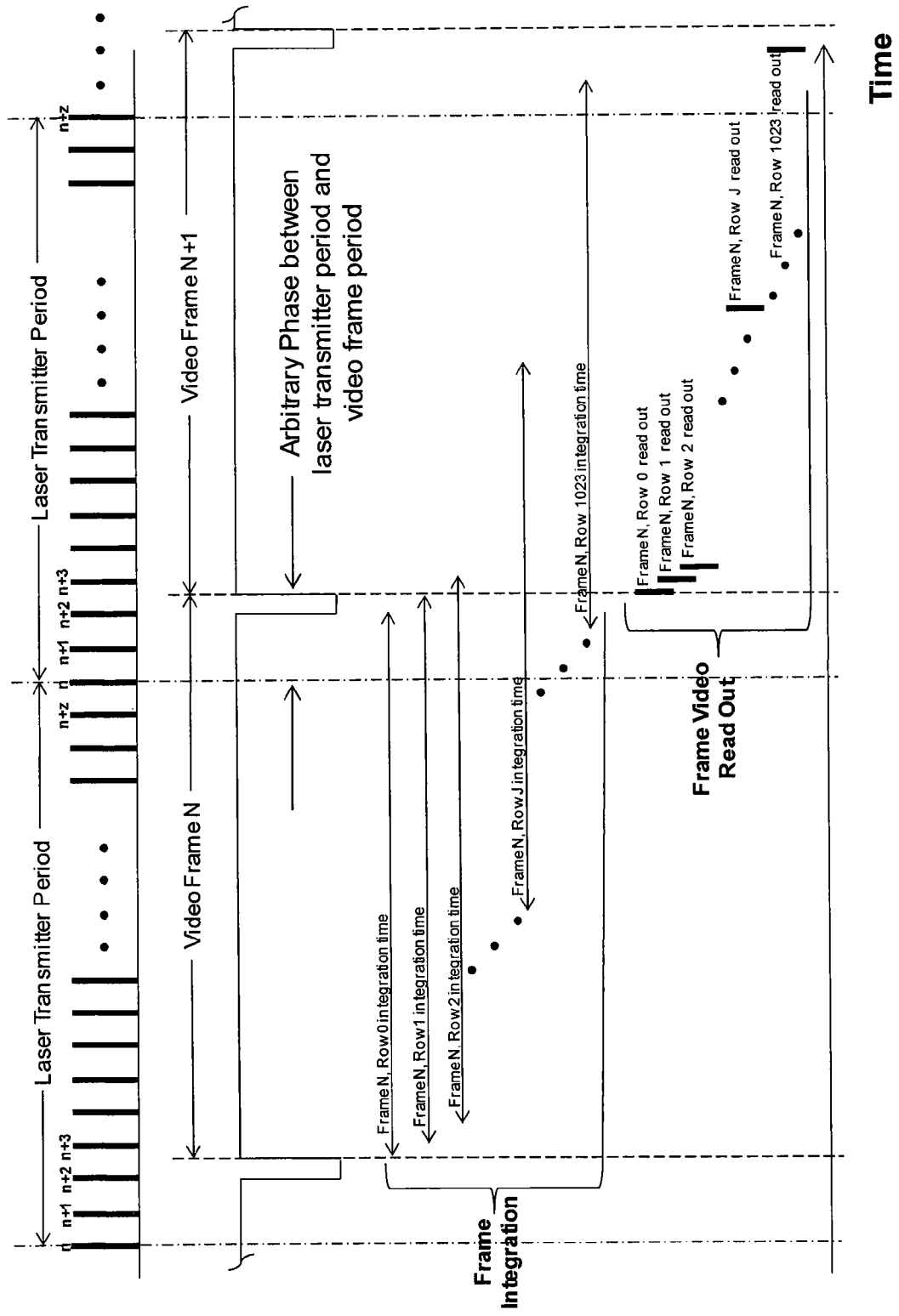
FIG. 9 is a graph depicting the relationship between laser pulses of a laser aiming device and timing of a camera of FIG. 5.

FIG. 9 shows the relationship of the laser packet burst timing of laser aiming device 202 (FIG. 5) with respect to the video data timing of camera 12 (FIG. 5). The timing relationship shown in FIG. 9 has an arbitrary phase relationship between the video frame timing and the laser burst timing. The successful functioning of the colorized aim point does not depend on a specific phase relationship between an imaging component such as a CMOS imager and a laser burst timer of a laser aiming device 202 (FIG. 5). A video processor subsystem within image processing electronics 16 (FIG. 5), for example, can detect the phase relationship between the camera 12 (FIG. 5) and the laser aiming device 202 (FIG. 5), and adjust accordingly. Image processing electronics 16 may use the timing information contained within both video signal 516 from the camera 12 and the demodulated laser signal 518 from the demodulator within the camera 12.

Each of the black vertical bars in FIG. 9 represents a complete laser packet. Each laser packet contains digital information such as described with reference to FIG. 6. As seen in FIG. 9, the laser packets are labeled with an incrementing packet number (e.g., "n", "n+1", "n+2", etc. . . . ). The "n" value corresponds to the "laser transmitter time code" shown in FIG. 9. This time code increments at each successive laser burst until it reaches the maximum value designed into the packet. On the next laser transmission, the time code starts over at value zero and begins the recursive count again. The maximum value of the packet ID number and time code are arbitrary, and depend upon the pulse repetition frequency of the laser aiming device 202 (FIG. 5) and the pulse period desired for a specific implementation. Packet designs of various lengths, containing a plurality of packet ID values and time code values may be used.

In an exemplary embodiment, the laser transmitter period is nominally the same as the video frame period. Exact matching of these respective periods, however, is not required. One implementation of the colorized aim point anticipates physically separate laser transmitter and NVG components. In lieu of an explicit synchronizing connection between these two components, an algorithm of image processing electronics 16 (FIG. 5) may detect and keep track of both laser burst period and the camera period. This is sufficient for a successful implementation of the colorized aim point system. Variants of this approach that do entail explicit wired or wireless connection between the laser transmitter and the NVG are also within the scope of the present invention.

Figure 10:
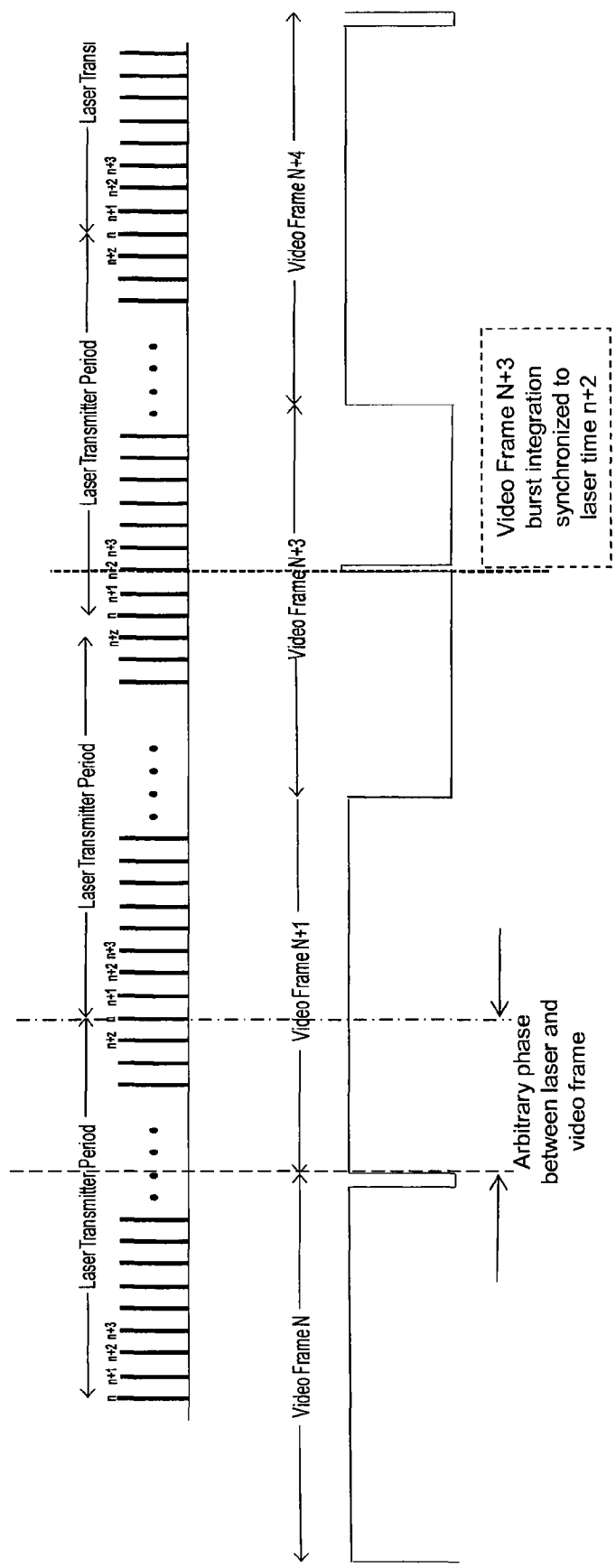
FIG. 10 is a timing diagram for the laser aiming device and camera of FIG. 5.

FIG. 10 depicts the timing diagrams of laser aiming device 202 (FIG. 5) and camera 12 (FIG. 5) for operation where the laser spot is located within the video FOV. As previously stated, laser aiming device 202 may emit periodic bursts of digital data continuously. These bursts are represented by the vertical bars at the top of FIG. 10.

The video waveform is seen in the lower portion of FIG. 10. Video frame numbers "N", "N+1", and "N+4" are as previously described. The extended rise times shown for these frames indicate that full photonic integration is occurring. Frame "N+3" shows a significantly different waveform. The very short integration period allowed for this frame is achieved by gating the image intensifier portion of camera 12 "ON" for a short duration. Although the CMOS imaging die performs a standard integration period, only the photoelectrons that pass through the intensifier portion (e.g., through intensifier tube 704; FIG. 7) during this short gate period convey image information to the die.

The intensifier gate timing is controlled by the image processing electronics 16 (FIG. 5). This electronic subsystem may detect all of the demodulated laser signals 518 and identify the unique laser that is to have its laser aiming spot colorized. Having synchronized a processor clock to the unique laser burst frequency, image processing electronics 16 "anticipate" an arbitrary laser burst, within the continuous transmission, and gates on the camera 12 for the short period within which the unique laser reflected return reaches the camera lens. The timing of this very short integration period is selected by image processing electronics 16 to avoid returns from other lasers in the video FOV.

Since most of the light energy detected by camera 12, during frame N+3, is from the reflected return of the unique laser spot, this frame of video data contains the laser spot on an otherwise dark background. This video frame thus locates the instantaneous position of the unique laser spot within the video FOV. The image processing electronics performs an analysis of this video frame to establish the row and pixel numbers at the centroid of the laser spot. This position is stored to memory (not shown) by image processing electronics 16.

In video frame N+4, and a set number of succeeding frames, the stored spot position data is used to create the colorized laser spot. The succeeding frames are fully integrated and have all the image data available from the scene. Image processing electronics 16 superimpose the laser spot image onto each of these succeeding video frames in a color that contrasts with any other laser spots.

The short, synchronized integration frame is repeated periodically, to update the location of the laser spot. In an exemplary embodiment, the ratio of short to normal video frames may be varied over a range of approximately 1:5 to 1:20. This ratio will determine the accuracy of the colorized laser spot position in the video FOV. If there are significant dynamics in the video scene, such as high pan rates, the lower ratio (1:5) will result in higher accuracy. With low scene dynamics, the higher ratio (1:20) will suffice.

Enhancements to this basic scheme may be implemented to increase the aim point accuracy as needed. A variation of image processing electronics 12 includes a motion detection transducer, such as a MEMS accelerometer. This device senses scene dynamics caused by movement of the NVG, and automatically selects a ratio that maximizes aim point accuracy. High scene dynamics due to movement in the scene can also be detected by algorithms in image processing electronics 12. By continuously running this algorithm, the appropriate ratio will be automatically selected for best accuracy.

Figure 11:
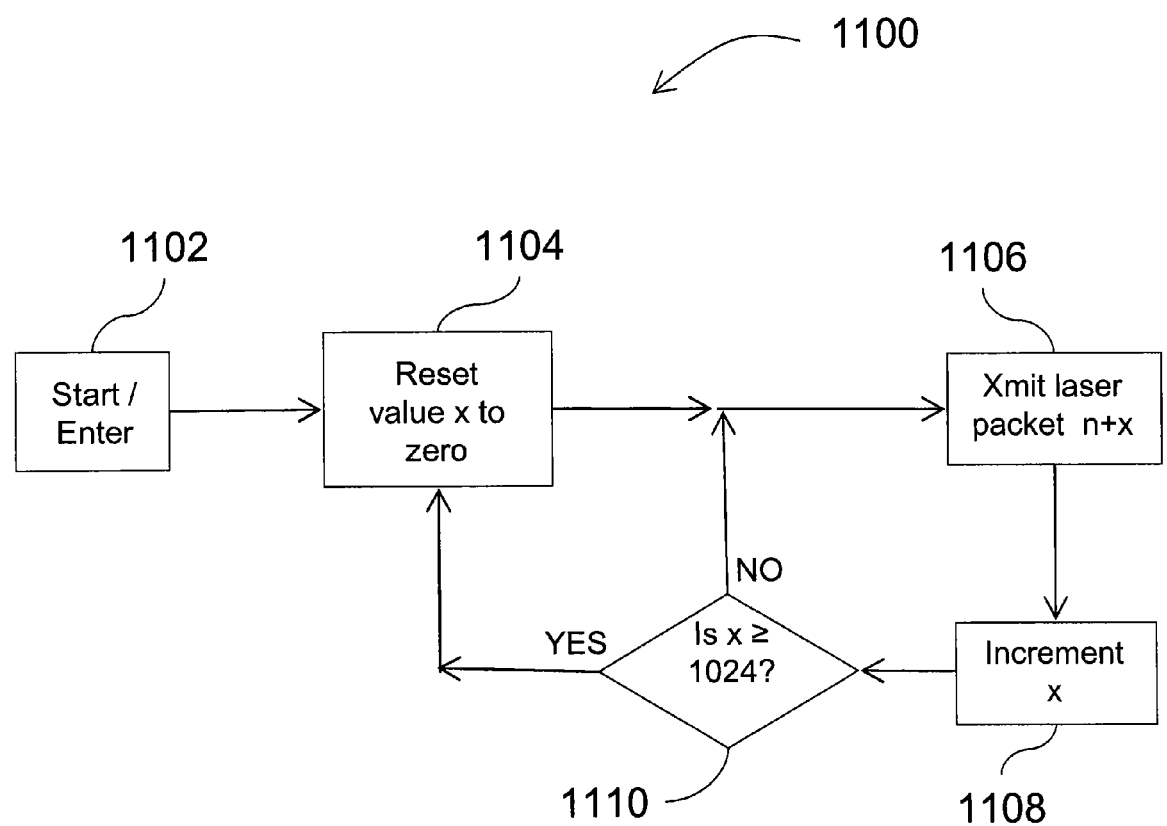
FIG. 11 is a flow chart of exemplary steps performed by the laser aiming device of FIG. 5.

FIG. 11 is a flowchart 1100 of exemplary steps performed by a laser transmitter circuit of laser aiming device 202 to generate time codes, such as time code 604 (FIG. 6) generated by electro-optical modulator 506 (FIG. 5). At block 1102, the process starts. At block 1104, a packet value, x, is reset to zero, "0." At block 1106, a laser packet n+x is transmitted. At block 1108, the value, x, is incremented by one, "1." At block 1110, a decision is made regarding the value, x. If the value, x, is less than 1024 (10 bits=$2^{10}$=1024 values), processing proceeds at block 1106, with the value, x, being incremented. If the value, x, is greater than or equal to 1024, processing proceeds at block 1104, with the value, x, being reset to zero.

Figure 12:
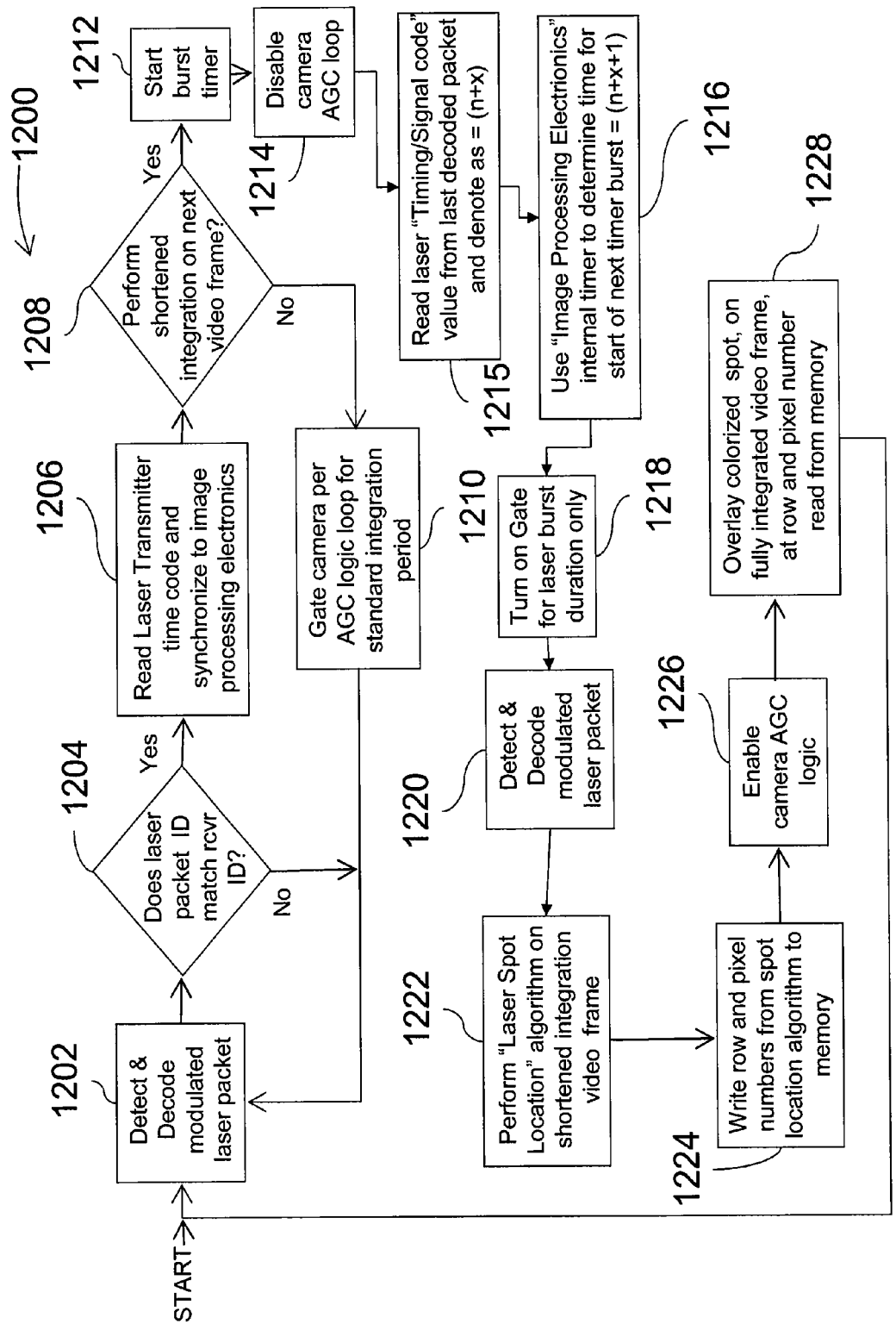
FIG. 12 is a flow chart of exemplary steps performed by the image processing electronics 16.

FIG. 12 is a flow chart 1200 of exemplary steps performed by image processor electronics 16 (FIG. 5) for colorizing a laser spot associated with particular laser aiming device. At block 1202, modulated laser packets are detected and decoded to identify a laser packet ID. At block 1204, a decisions is made regarding the laser packet ID. If the laser packet ID identified at block 1202 does not match a stored laser packet ID associated with the particular aiming device, processing proceeds back to block 1202 with the detection and decoding of further modulated data packets. If the laser packet identified in block 1202 matches the stored laser packet ID associated with the particular laser aiming device, processing proceeds to block 1206.

At block 1206, a laser transmitter time code within the decoded laser packet is read and used to synchronize image processing electronics 16. At block 1208, a decision is made regarding whether to shorten integration on the next video frame. This decision may be based on the number of frames since the last shortened integration period. For example, the integration may be shortened every five frames based on input from a conventional counter. If a decision is made not to shorten integration, processing proceeds at block 1210 with the camera 12 gated for a standard integration period, e.g., in accordance with an automatic gain control (AGC) logic loop.

At block 1212, which is reached if a decision in made at block 1208 to shorten integration, a burst timer is started and, at block 1214, the AGC logic loop for camera 12 is disabled.

At block 1215, the "timing/signal code" value from the last decoded packet read is denoted, e.g., as equal to n+x. In an exemplary embodiment, this is the laser transmitter time code read in step 1206 above. At block 1216, a determination is made regarding whether it is time to start the next burst. In an exemplary embodiment, a timer internal to image processing electronics 16 (FIGS. 1 and 5) is used to determine the time for the start of the next timer burst, e.g., n+x+1. If it is determined that it is not time for the laser burst, the AGC logic loop remains disabled until it is determined that it is time for the laser burst. If it is determined that it is time for the laser burst, processing proceeds at block 1218.

At block 1218, camera 12 is gated on for the laser burst duration only in response to determination of time for start of next timer burst in step 1216. At block 1220, the modulated laser packet received during the laser burst duration is detected and decoded.

At block 1222, a laser spot location algorithm is applied to the shortened integration video frame to generate row and pixel numbers corresponding to the spot. Suitable laser spot location algorithms will be understood by one of skill in the art from the description herein.

At block 1224, row and pixel numbers generated by the spot location algorithm are written to a memory. At block 1226, the AGC logic loop is enabled. At block 1228, a colorized spot is overlaid on the fully integrated video frame, at the row and pixel numbers read from memory. Processing returns to block 1202 for detecting and decoding subsequent modulated laser packets.

Additional details regarding various component associated with suitable night vision systems for implementing aspects of the present invention are now described. Additional details may also be found in U.S. Pat. No. 6,560,029 to Dobbie et al. entitled Video Enhanced Night Vision Goggle, which is incorporated fully herein by reference.

Figure 13:
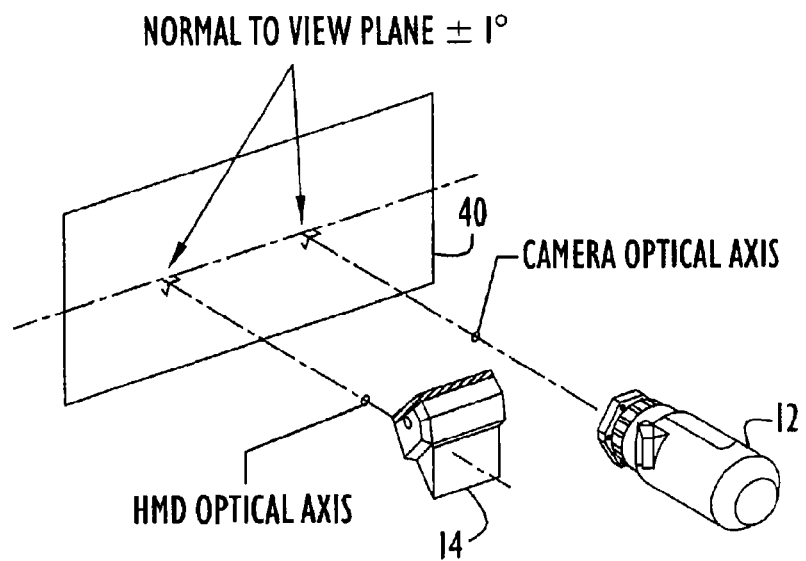
FIG. 13 is an illustrative image of a prior art optical alignment technique.

The optical axes of video camera 12 and video display 14 may be optically aligned in accordance with the prior art as shown in the FIG. 13. This alignment provides an intensified image that appears at the same field angles to the user as would be the case if the night vision system were not being worn. This ensures that there is minimum deviation of the night vision system image space with respect to the object space in the "real world." As shown in FIG. 13, image intensified video camera 12 and video display 14 are oriented so that both of their optical axes are about normal to plane 40.

Figure 14:
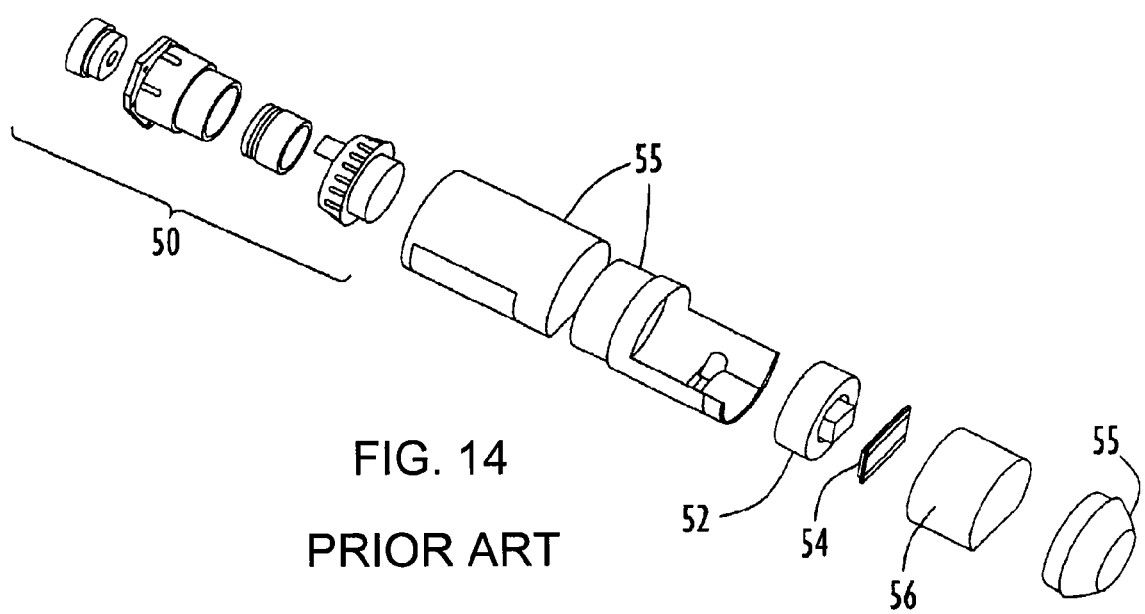
FIG. 14 is an exploded view of a prior art image intensified video camera.

FIG. 14 is an exploded view of the components of a prior art image intensified video camera that may be modified in a manner that will be understood by one of skill in the art from the description herein for use as image intensified video camera 12 (FIG. 5) in accordance with the present invention. These components are objective lens assembly 50, image intensifier tube 52, imaging array 54, high voltage power supply (HVPS) 56, and camera housing 55. Objective lens assembly 50 provides a focused image of a low light level scene to the image intensifier input surface (the photocathode). The image intensifier is powered by the HVPS. The image intensifier amplifies the faint image at its input and reproduces a brighter version of this image on its output surface. This image is coherently transmitted to the electronic imaging array by the use of a fused fiber optic bundle. The imaging array, which may for example be of the CMOS or CCD type, senses the now intensified image and creates a real time video signal that contains a rendition of the image. The video camera thus receives electrical power and a low light image and outputs a video signal of the low light level scene.

Figure 15:
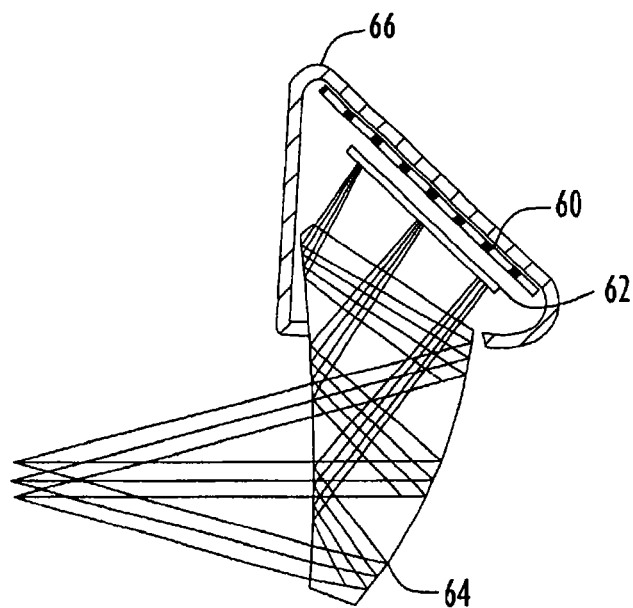
FIG. 15 is a cross sectional view of a helmet mounted display (HMD) module for use with the present invention that illustrates a prior art image light path.

The video signal is fed to display 14. Display 14 presents the video image to the user's eye. An embodiment of a prior art display is shown in FIG. 15, which is a cross sectional view of the display module that illustrates the image light path as well as the relative position of each component. The video signal is received by the display printed circuit board 60. The printed circuit board, also receives DC voltages from a power bus. The printed circuit board, which may be considered a driver, outputs electrical signals to a flat panel display 62, which converts the signals into a two dimensional video image.

The video image on the video display may be viewed by the user with aid of a prismatic eyepiece 64. This eyepiece optic presents the video image as if it were at a significant distance (optical infinity) so that the user's aided eye can focus for this distance. The prism is placed in front of the user's eye, just beyond where a lens from a pair of glasses would be located. The prismatic eyepiece performs its optical function by internal reflections within the prism off surfaces whose curvatures produce the requisite optical powers that, in combination, make the display image appear at infinity. A particular prismatic eyepiece which may be used is disclosed in U.S. Pat. No. 5,701,202, which is incorporated fully herein by reference. The components are held in relative position to one another, and are protected from the outside environment, by the display housing 66.

Figure 16:
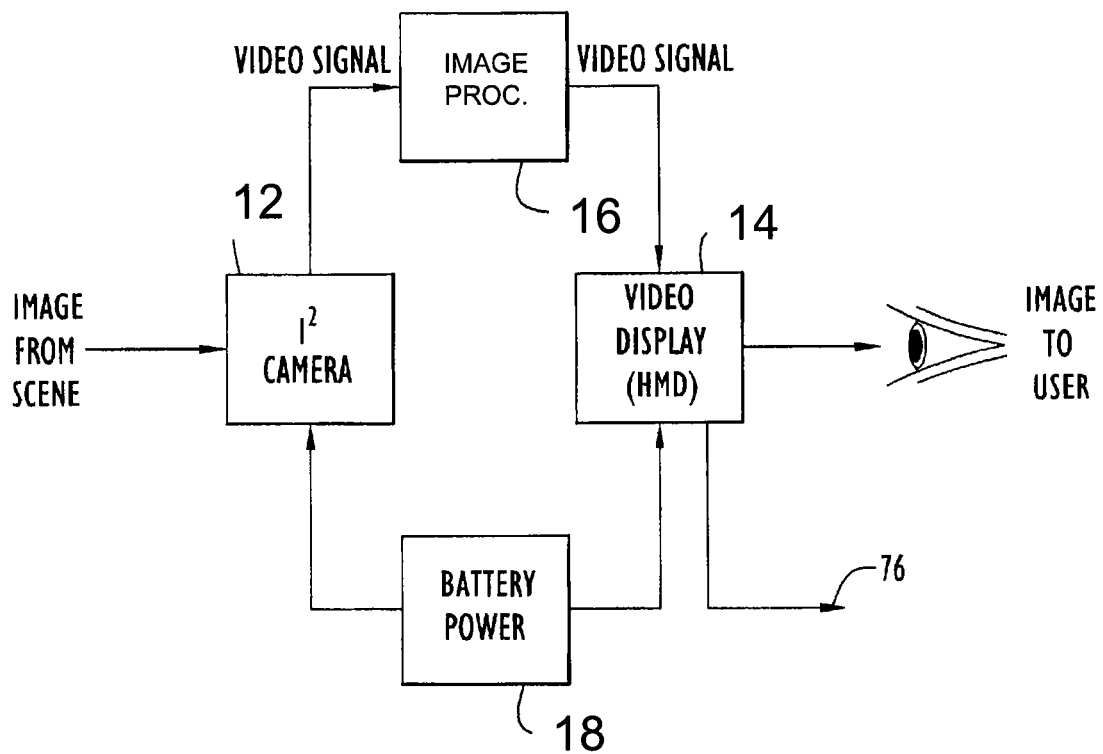
FIG. 16 shows an embodiment of a basic video enhanced night vision system for implementing aspects of the present invention.

FIG. 16 shows a functional block diagram of one embodiment of the present invention. The image intensified video camera 12 senses light from the scene and creates a real time video signal that contains an electronic image of the scene. This video signal is transmitted to the video display 14, which receives the video signal, and generates a two dimensional image that can be viewed by the human eye.

An image processor 16 between video camera 12 and video display 14 processes the video signal from video camera 12 in accordance with the present invention. Image processor 16 may contain a micro-processor, FPGA logic gates, and RAM. It receives the video signal from video camera 12, which it also controls. It reformats the video data with an on-board program and transmits the "processed" video data to the video display 14. The image processor 16 may be a programmable device, which offers programmable flexibility.

The image intensified video camera 12, image processor 16, and video display 14 receive electrical energy from power source 18, which may be comprised of batteries. The input to the system is the image scene light, while the primary output is the intensified image scene presented by video display 14 and viewed by the user.

The image processor 16 provides the capability of performing real-time image processing of the video signal for the purpose of enhancing the picture presented to the user to include a distinguishable aiming spot. Enhancements may additionally include but are not limited to contrast stretching, edge detection/enhancement, MTF peaking (aperture correction), integration, mixing/overlaying of intensified video with externally input video, averaging, and other known image processing functions.

Figure 17:
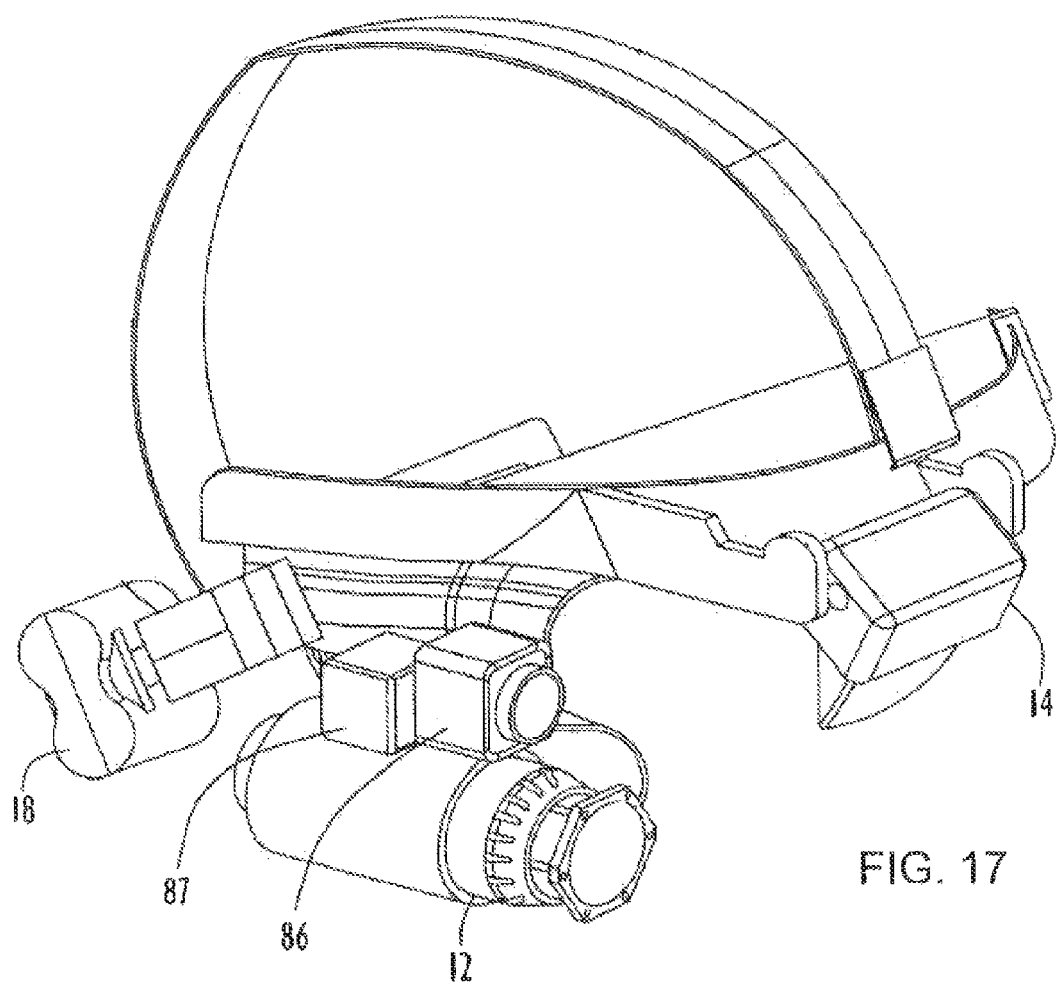
FIG. 17 shows an embodiment of an enhanced night vision system that incorporates both image intensified video and thermal camera modules for implementing aspects of the present invention.

A further embodiment of a night vision goggle in accordance with the present invention is shown in FIG. 17. In this embodiment, a thermal imaging camera 86 is added to the basic embodiment depicted in FIG. 1, and image processor 87 is also shown. Thermal imaging cameras are responsive to different portions of the electromagnetic spectrum than image intensification ($I^2$) devices, and thus provide additional information to the viewer.

In accordance with an aspect of the invention, the image from the thermal camera may be "fused" with the image from the image intensified video camera 12, so that the viewer sees the two images superimposed on each other. FIG. 17 shows image processor 87 which is capable of providing the functionality of image processor 16 described above and effecting the fusion, and FIG. 18 is a block diagram of the electronic system therefor.

Figure 18:
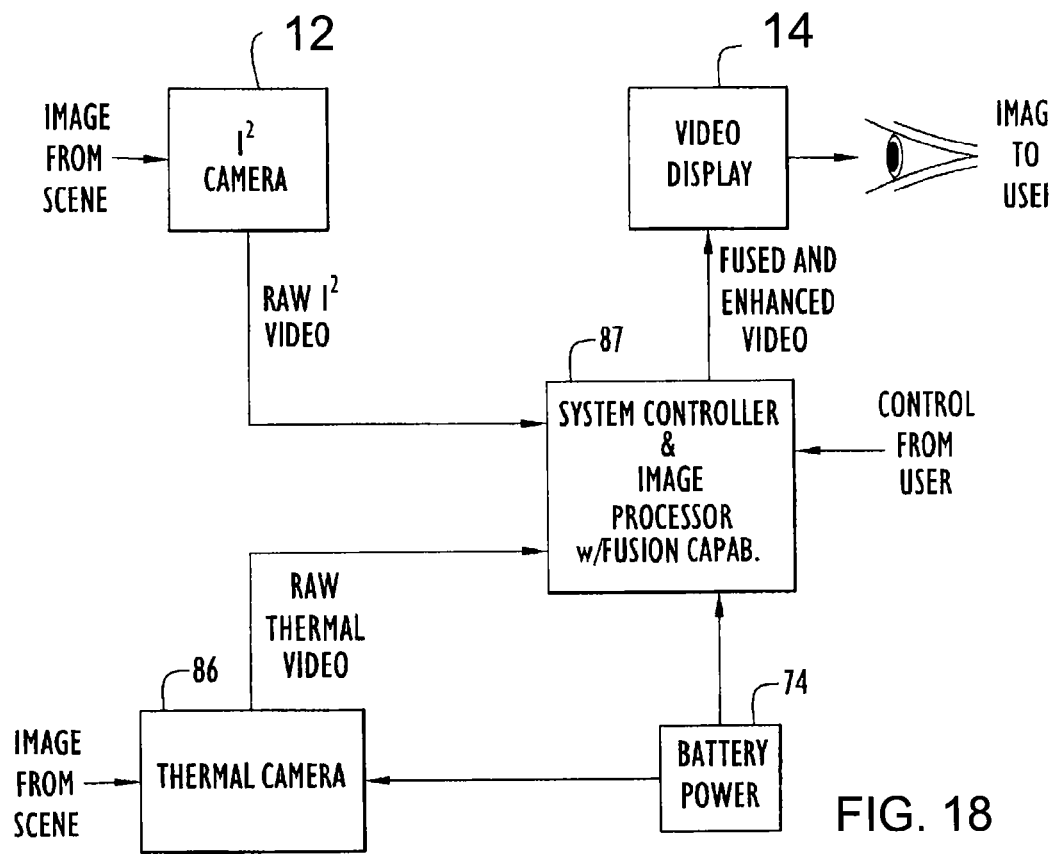
FIG. 18 is a block diagram of an embodiment which utilizes image fusion for implementing aspects of the present invention.

Referring to the FIG. 18, the unprocessed video camera 12 and thermal camera 86 video signals are fed to the image processor 87. The image processor 87 includes the functionality of image processor 16 previously described, and also the image fusion function. The image fusion function electronically overlays the two video images, adjusts their relative brightnesses, and may also add color cueing information. The fusion and image enhancement functions may both be controlled by the user via physical controls on the goggle. Video display 14 presents the video image that is the result of the enhancements and fusion processing.

Two light wavelength bands which may be used are the 400-nm to 900-nm band (for the image intensifier) and the 8 µm to 12 µm band (for the thermal camera). The thermal camera may be based on an uncooled focal plane array (FPA) and incorporates its own objective lens, which is designed to provide a thermal video field of view that is essentially the same as the field of view of the $I^2$ camera. The optical axes of the thermal and $I^2$ cameras are aligned parallel during assembly of the system to simplify the processing task of fusing the two video images by overlaying the two video signals of a common scene.

Figure 19:
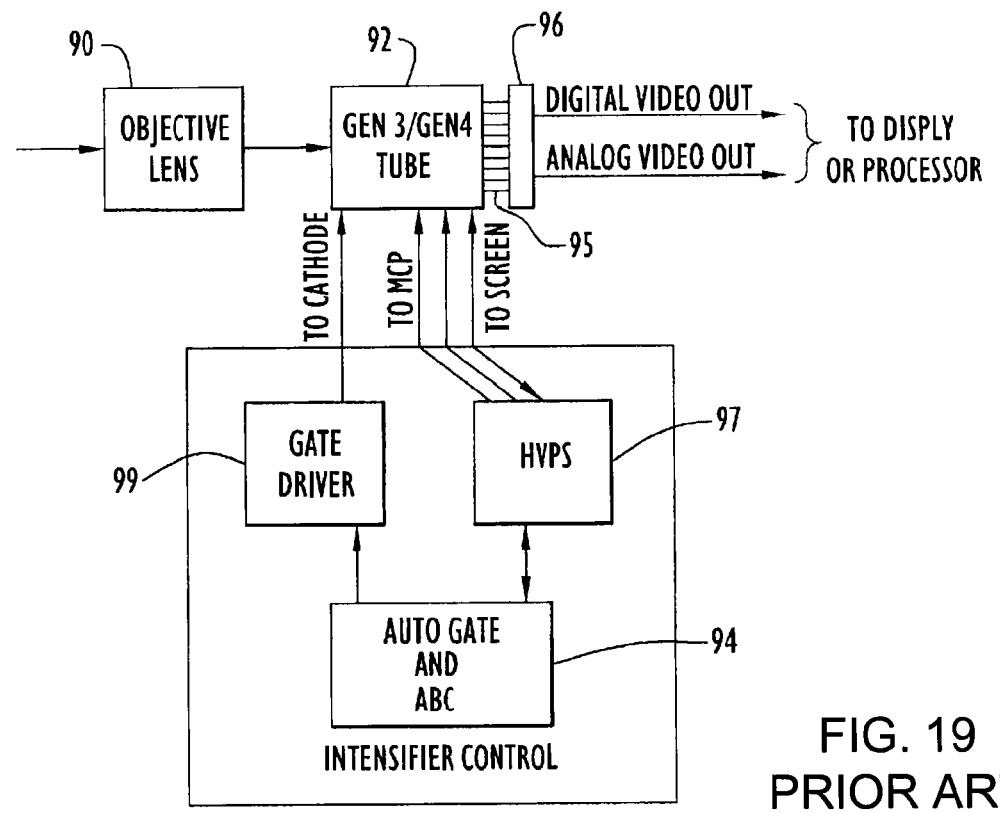
FIG. 19 is a block diagram of a prior art image intensified video camera and basic power supply.

FIG. 19 depicts a prior art embodiment of basic functional architecture for an image intensified camera module. In this architecture, objective lens 90 focuses light from the scene onto the photocathode of image intensifier 92. The tube also contains a microchannel plate (MCP) for amplifying electrons and a phosphor screen having a screen optic 95. The tube is powered by an auto-gating HVPS 97. The auto-gate 94 controls the HVPS 97, which supplies voltage to the microchannel plate and screen, and also controls the gate driver 99 which supplies the cathode voltage. The auto-gating allows for operations into higher light levels than is possible with a conventional, non-gated wrap-around type HVPS.

The control loops that determine microchannel plate voltage and gate duty cycle may be integral to the HVPS. Auto-gate block 94 includes an automatic brightness control function (ABC), which truncates the linear gain characteristic of the tube and effectively sets a maximum brightness output. To provide a properly exposed and adequately bright image from the intensifier tube, the control circuits automatically optimize the screen luminance from the tube. This image from the image intensifier is fiber optically coupled by screen fiber optic 95 to the imaging chip 96. As an example, FIG. 19 shows a CMOS "camera-on-a-chip" at this position in the architecture, although other solid state imaging arrays could also be used. For example, a CCD chip with its associated camera printed circuit boards could perform the same function as the CMOS camera.

This CMOS camera functional block has the purpose of sensing the 2-D image on its pixel array and generating a real-time video signal representation of that image. Integral to this integrated circuit is the camera automatic gain control (AGC) function. This control loop adjusts effective camera gain so the video signal image has optimum intra scene dynamic range at any given time. The AGC loop may be integral to the CMOS camera-on-a-chip, so this control loop is not shown in FIG. 19. Depending on specific type, the CMOS camera may output digital video signals, analog video signals, or both types of signals.

The video camera architecture shown in FIG. 19 has two independent control loops. The tube gain/gating loop operates as in a direct view system and receives feedback signals only from the tube. The CMOS camera subsystem has its AGC loop effectively operating independently of the tube/power supply. For the overall camera to operate in a suitable manner, the time constants of the two independent control loops are designed to be different. Otherwise, a positive feedback condition may occur with the loss of useful video imagery.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for distinguishing a laser aiming spot associated with a particular firearm from other laser aiming spots, the method comprising:
   imaging a field of view with a night vision system, the field of view including the laser aiming spot and the other laser aiming spots, wherein the laser aiming spot is produced by a laser beam associated with the particular firearm, the laser beam having an identification signature; and
   the identification signature including a digitally encoded pattern of bits representing a unique number,
   identifying the identification signature of the laser aiming spot associated with the particular firearm within the imaged field of view;
   modifying the imaged field of view to distinguish the identification signature of the identified laser aiming spot from other identification signatures of the other laser aiming spots; and
   displaying the modified field of view with the night vision system;
   wherein the step of identifying the laser aiming spot produced by the laser beam comprises:
   imaging the field of view with multiple patterns of bits, wherein each pattern of bits represents the same unique number,
   synchronizing a camera gating within the night vision system to one of the multiple patterns of bits to increase the apparent luminance of the laser aiming spot,
   wherein the apparent luminance is increased by synchronizing the one pattern of bits to a camera gate in the night vision system, the camera gate being ON during a frame to receive only the one pattern of bits and OFF during the remainder of the frame.

2. The method of claim 1, wherein the modifying step comprises:
   modifying the field of view to display the laser aiming spot in a color different from the other laser aiming spots.

3. The method of claim 1, wherein the modifying step comprises:
   modifying the imaged field of view to display the laser aiming spot as a flashing spot and the other laser aiming spots as continuous spots.

4. The method of claim 1, wherein the modifying step comprises:
   modifying the imaged field of view to display the laser aiming spot as a continuous spot and the other laser aiming spots as flashing spots.

5. The method of claim 1, wherein the modifying step comprises:
   modifying the imaged field of view to display the laser aiming spot and to omit the other laser aiming spots.

6. A night vision system for distinguishing a laser aiming spot associated with a particular firearm from other laser aiming spots, the system comprising:
   a camera configured to image a field of view;
   an image processor coupled to the camera, the image processor configured to identify a laser aiming spot within the field of view associated with the particular firearm and modify the imaged field of view to distinguish the identified laser aiming spot from the other laser aiming spots within the field of view; and
   a display coupled to the image processor, the display configured to displaying the modified field of view;
   wherein the laser aiming spot is produced by a laser beam associated with the particular firearm, the laser beam having multiple bursts of pulses, each burst having the same identification signature; the identification signature includes a digitally encoded pattern of bits representing a unique number;

the image processor is configured to identify the identification signature of the identified laser aiming spot; and the image processor is configured to distinguish the identification signature of the identified laser aiming spot from other identification signatures of the other laser aiming spots;

wherein the image processor is configured to synchronize a gating of the camera within the night vision system to a single burst to increase the apparent luminance of the laser aiming spot, and the apparent luminance is increased by synchronizing the single burst to a camera gate in the night vision system, the camera gate being ON during a frame to receive only the single burst and OFF during the remainder of the frame.

7. The system of claim 6, wherein the image processor is configured to modify the field of view to display the laser aiming spot in a color different from the other laser aiming spots.

8. The system of claim 6, wherein the image processor is configured to modify the imaged field of view to display the laser aiming spot as a flashing spot and the other laser aiming spots as continuous spots.

9. The system of claim 6, wherein the image processor is configured to modify the imaged field of view to display the laser aiming spot as a continuous spot and the other laser aiming spots as flashing spots.

10. The system of claim 6, wherein the image processor is configured to modify the imaged field of view to display the laser aiming spot and to omit the other laser aiming spots.

11. A method for distinguishing a laser aiming spot associated with a particular firearm from other laser aiming spots, the method comprising:

imaging a field of view with a night vision system, the field of view including the laser aiming spot and the other laser aiming spots, wherein the laser aiming spot is produced by a laser beam associated with the particular firearm, the laser beam having an identification signature; and the identification signature including a digitally encoded pattern of bits representing a unique number, identifying the laser aiming spot associated with the particular firearm within the imaged field of view;

modifying the imaged field of view to distinguish the identified laser aiming spot from the other laser aiming spots; and displaying the modified field of view with the night vision system;

wherein the step of identifying the laser aiming spot produced by the laser beam comprises:

imaging the field of view with multiple patterns of bits, wherein each pattern of bits represents the same unique number, synchronizing a camera gating within the night vision system to one of the multiple patterns of bits to increase the apparent luminance of the laser aiming spot, and wherein the apparent luminance is increased by synchronizing the one pattern of bits to a camera gate in the night vision system, the camera gate being ON during a frame to receive only the one pattern of bits and OFF during the remainder of the frame.

12. The method of claim 11, wherein the modifying step comprises:

modifying the field of view to display the laser aiming spot in a color different from the other laser aiming spots.

13. The method of claim 11, wherein the modifying step comprises:

modifying the imaged field of view to display the laser aiming spot as a flashing spot and the other laser aiming spots as continuous spots.

14. The method of claim 11, wherein the modifying step comprises:

modifying the imaged field of view to display the laser aiming spot as a continuous spot and the other laser aiming spots as flashing spots.

15. The method of claim 11, wherein the modifying step comprises:

modifying the imaged field of view to display the laser aiming spot and to omit the other laser aiming spots.

* * * * *